United States Patent [19]

Pinsky et al.

[11] Patent Number: 4,787,125
[45] Date of Patent: Nov. 29, 1988

[54] BATTERY ELEMENT AND BATTERY INCORPORATING DOPED TIN OXIDE COATED SUBSTRATE

[75] Inventors: Naum Pinsky, Thousand Oaks; Saulius A. Alkaitis, Venice, both of Calif.

[73] Assignee: Ensci, Inc., Woodland Hills, Calif.

[21] Appl. No.: 82,277

[22] Filed: Aug. 6, 1987

Related U.S. Application Data

[62] Division of Ser. No. 843,047, Mar. 24, 1986, Pat. No. 4,708,918.

[51] Int. Cl.⁴ ..................... H01M 4/60; B23P 13/00
[52] U.S. Cl. ........................................... 29/2; 427/213; 427/217; 427/255.2; 427/124; 429/212
[58] Field of Search ............... 29/2; 427/213, 217, 427/255.2, 124; 429/212

[56] References Cited

U.S. PATENT DOCUMENTS

| | | | |
|---|---|---|---|
| 4,108,107 | 8/1978 | Scheuermann | 427/255.5 X |
| 4,606,941 | 8/1986 | Jenkin | 427/217 |
| 4,664,935 | 5/1987 | Strahl | 427/255.5 X |
| 4,664,944 | 5/1987 | Hsu et al. | 427/213 X |

Primary Examiner—Brian E. Hearn
Assistant Examiner—Stephen J. Kalafut
Attorney, Agent, or Firm—Frank J. Uxa

[57] ABSTRACT

A battery element useful as at least a portion of the positive plates of a lead-acid battery comprises an acid resistant substrate coated with electrically conductive doped tin oxide. This battery element may also be used in the bipolar plates of a lead-acid battery.

5 Claims, 1 Drawing Sheet

BATTERY ELEMENT AND BATTERY INCORPORATING DOPED TIN OXIDE COATED SUBSTRATE

This application is a division of application Ser. No. 06/843,047, filed Mar. 24, 1986, now U.S. Pat. No. 4,708,918.

TECHNICAL FIELD

The present invention relates to battery elements useful in lead-acid batteries. More particularly, the invention relates to battery elements for use in lead-acid batteries, which elements include a substrate having a conductive coating.

BACKGROUND ART

Even though there has been considerable study of alternative electrochemical systems, the lead-acid battery is still the battery of choice for general purposes, such as starting a vehicle, boat or airplane engine, emergency lighting, electric vehicle motive power, energy buffer storage for solar-electric energy, and field hardware, both industrial and military. These batteries may be periodically charged from a generator.

The conventional lead-acid battery is a multi-cell structure. Each cell comprises a set of vertical positive and negative plates formed of lead-acid alloy grids containing layers of electrochemically active pastes. The paste on the positive plate when charged comprises lead dioxide, which is the positive acting material, and the negative plate contains a negative active material such as sponge lead. An acid electrolyte, based on sulfuric acid, is interposed between the positive and nagative plates.

Lead-acid batteries are inherently heavy due to use of the heavy metal lead in constructing the plates. Modern attempts to produce light-weight lead-acid batteries, especially in the aircraft, electric car and vehicle fields, have placed their emphasis on producing thinner plates from lighter weight materials used in place of and in combination with lead. The thinner plates allow the use of more plates for a given volume, thus increasing the power density.

Higher voltages are provided in a bipolar battery including bipolar plates capable of through-plate conduction to serially connected electrodes or cells. The bipolar plates must be impervious to elctrolyte and be electrically conductive to provide a serial connection between electrodes.

U.S. Pat. Nos. 4,275,130, 4,353,969; 4,405,697; 4,539,268; 4,507,372; 4,542,082; 4,510,219; and 4,547,443 relate to various aspects of lead-acid batteries. Certain of these patents discuss various aspects of bipolar plates.

Attempts have been made to improve the conductivity and strength of bipolar plates. Such attempts include the use of conductive carbon particles or filaments such as carbon, graphite or metal in a resin binder. However, carbonaceous materials are oxidized in the agressive electrochemical environment of the positive plates in the lead-acid cell to acetic acid, which in turn reacts with the lead ion to form lead acetate, which is soluble in sulfuric acid. Thus, the active material is gradually depleted from the paste and ties up the lead as a salt which does not contribute to the porduction or storage of electricity.

The metals fare no better; most metals are not capable of withstanding the high potential and strong acid envi-ronment present at the positive plates of a lead-acid battery. While some metals, such as platinum, are electrochemically stable, their prohibitive cost prevents their use in high volume commercial applications of the lead-acid battery.

SUMMARY OF THE INVENTION

One object of the present invention is to provide an improved battery element useful in a lead-acid battery.

Another object of the present invention is to provide an improved lead-acid battery.

A further object of the present invention is to provide an improved bipolar plate lead-acid battery.

An additional object of the present invention is to provide a battery element useful in a lead-acid battery, which element includes a substrate coated with doped tin oxide using an improved process.

A still further object of the present invention is to provide an improved process for at least partially coating a substrate with a metal oxide. These and other objects and advantages of the present invention will become apparent hereinafter.

An improved battery element useful in a lead-acid battery has been discovered. In one broad embodiment, the battery element is useful as at least a portion of the positive plates of the battery and comprises an acid resistant substrate coated with electrically conductive doped tin oxide. In an additional embodiment, the battery element further comprises a fluid impervious matrix layer having mutually opposing first and second surfaces situated such that at least a portion of the coated substrate is embedded in the matrix layer to form a fluid impervious conductive composite. In another embodiment, the battery element further comprises a positive active electrode material situated such that at least a portion of the coated substrate contacts the electrode material. In one embodiment, the positive active electrode material is in the form of a layer located adjacent to, and in electrical communication with, the first surface of the matrix layer of the above-noted composite. In a further embodiment, the battery element last described above further comprises a fluid-impervious conductive layer that is adjacent to, and in electrical communication with, the second surface of the matrix layer. In yet another embodiment, the element last described above further comprises a negative active electrode layer located adjacent to, and in electrical communication with the fluid impervious conductive layer.

An improved process for coating the substrate of the present battery elements with doped tin oxide has also been discovered.

The present battery element comprising a substrate coated with electrically conductive doped tin oxide is useful to provide improved performance in both conventional lead-acid batteries and in bipolar plate lead-acid batteries. For example, the doping of the tin oxide (stannic dioxide) coating greatly enhances the electrical conductivity (reduces the resistivity) of the present battery element.

As noted previously, in conventional lead-acid batteries, lead dioxide is used as the positive active electrode material and the electrolyte is sulfuric acid or a sulfuric acid based material. Electrical conductivity through the positive active electrode material is required for proper functioning of the battery. However, as the battery discharges, lead sulfate, an electrical insulator is formed from the lead dioxide, an electrical conductor. The present acid resistant substrate coated with doped tin oxide may be placed so that at least a portion of the coated substrate contacts the positive active electrode material. Even when some of this positive active material is converted to an electrical insulator, e.g., lead sulfate, the present substrate coated with doped tin oxide provides for electrical conductivity through the positive active material-insulator composition, and thereby improves the performance of the battery, e.g., a conventional lead-acid battery.

The combination of an acid resistant substrate coated with doped tin oxide has substantial electrical, chemical, physical and mechanical properties making it useful as a lead-acid battery element. For example, the element has substantial stability in the presence of, and is impervious to, the sulfuric acid or the sulfuric acid-based electrolyte. The doped tin oxide coating on the acid resistant substrate provides for increased electrochemical stability and reduced corrosion in the terribly agressive, oxidative-acidic conditions present on the positive side lead-acid batteries.

Any suitable dopant may be used to dope the tin oxide coating. The dopant or combination of dopants should be such as to be effective to improve the electric conductivity (reduce the resistivity) of the tin oxide coating on the substrate. The preferred dopant for the tin oxide coating is selected from the group consisting of fluoride ion, antimony ion and mixtures thereof. Fluoride ion is particularly preferred since it is especially tolerant of the agressive environment in a lead-acid battery. The amount of dopant present in the tin oxide coating may vary widely, provided that the amount present is effective to improve the electrical conductivity of the coating, e.g., relative to the conductivity of the coating with no dopant present. If fluoride ion is to be used as a dopant, it is preferred that the fluoride ion be present in the tin oxide coating in an amount in the range of about 0.01 mole % to about 20 mole %, based on the entire doped tin oxide coating.

The doped tin oxide coating on the acid resistant substrate is typically such that satisfactory electrical conductivity is achieved. This coating may also act to physically protect the substrate from the battery environment. The thickness of the coating may vary widely and depends, for example, on the electric conductivity desired, and on the type and amount of acid resistant substrate. The thickness of the coating may be as little as a molecular mono-layer. Preferably, the doped tin oxide coating has an average thickness in the range of about 0.01 micron to about 10 microns, particularly when the substrate is in the form of glass fibers having an average diameter in the range of about 1 micron to about 20 microns and the average length to diameter ratio of the glass fibers is in the range of about 100,000 to about 2,000,000.

Any suitable process may be employed to apply the doped tin oxide coating onto the substrate. The primary criterion for such processing is that an effective coating results. Where, as is preferred, the aid resistant substrate is in the form of particles or fibers, the doped tin oxide coating is preferably applied using spray pyrolysis or a new chemical vapor deposition process.

The spray pyrolysis process, which is particularly preferred, comprises spraying a composition comprising a tin component, a dopant-containing material and a solvent onto the substrate which is maintianed at elevated temperatures, preferably temperatures effective to evaporae at least a major portion of the solvent from the substrate; and subjecting the sprayed substrate to conditions, preferably oxidation conditions at elevated temperatures, effective to form the doped tin oxide coating on the sprayed substrate. The tin component and the dopant-containing material are preferably soluble in the solvent. In a preferred embodiment, the tin component is an inorganic tin component, such as tin oxide, tin halide, tin nitrate, mixtures thereof and the like, and the solvent comprises a hydroxyl group containing-solvent, such as methanol, ethanol, isopropanol, butanol, other alcohols, glycols, mixtures thereof and the like. The use of an inorganic tin component and a hydroxyl group-containing solvent provides a coating with outstanding electrical conductivity and ability to withstand the agressive environment in a lead-acid battery.

Another technique useful to apply the doped tin oxide coating on the substrate is generally referred to as the chemical vapor deposition (CVD) process. This process comprises (1) contacting a vaporous composition comprising a tin component and a dopant-containing material with the substrate; and (2) contacting the contacted substrate with an oxygen-containing vaporous medium at conditions effective to form the doped tin oxide coating on the substrate. The CVD process is conventional and well known in the art for coating a single flat surface which is maintained in a fixed position during steps (1) and (2). However, in a preferred embodiment, the present substrate is in the form of particles, fibers and the like. It has been found that the CVD process technology can be used to apply the doped tin oxide coating to these and other substrates provided that the substrate is maintained in substantially constant three dimensional motion during steps (1) and (2). By "three dimensional motion" is meant that the substrate, e.g., particles, fibers and the like, is in motion about its x axis, its y axis and its z axis. With the substrate being in substantially constant three dimensional motion, each point on the substrate is exposed to substantially the same conditions during steps (1) and (2). This, in turn, leads to a substantially uniform doped tin oxide coating on the substrate.

The substantially constant three dimensional motion of the substrate may be provided by mechanical means such as agitators and mixers. However, it is preferred that the motion occur in response to the vaporous composition and vaporous medium contacting the substrate. In other words, it is preferred that the force of the vaporous composition and the vaporous medium be sufficient so that the substrate is put into substantially constant three dimensional motion.

Steps (1) and (2) may occur sequentially, e.g., in a batch system in a single vessel with step (1) preceeding step (2). Alternately, steps (1) and (2) may occur substantially simultaneously in at least one fluidized bed reaction zone. In this latter system, the substrate is caused to move from one end of the zoneto the iother end of the zone and to be contacted first as in step (1) and then to be contacted as in step (2). In this manner, a continuous coating operation is provided. More than one fluidized bed reaction zone may be employed.

The tin component and dopant-containing material useful in the present CVD process include any such component and material useful to provide the desired doped tin oxide coating on the substrate. Tin components which are conventionally used to coat flat surfaces by the CVD process may be employed. It is preferred that an inorganic tin component be employed and that the tin component be other than tin oxide.

Fluorine gas and certain fluoride ion-forming materials are useful as the dopant-containing material in the present CVD process. Of course, if the dopant is to be other than fluoride ion, the dopant-containing material is to be changed accordingly.

The present three dimensional motion CVD process has applicability beyond providing doped tin oxide coatings on substrates useful in lead-acid batteries. Any suitable substrate can be at least partially coated with any suitable metal-containing material, e.g., tin oxide, titanium nitride and others, using the present process improvement, in the event the coating is to be metal-containing material other than an oxide, step (2) comprises contacting the contacted substrate with a vaporous medium at conditions effective to form the desired metal-containing material coating on the substrate.

As noted above, the acid resistant substrate is preferably in the form of particles or fibers. The substrate may be organic or inorganic. For example, the substrate may comprise an organic-based polymer material, a ceramic, a glass or like material. Because of availability, cost and performance considerations, it is preferred that the substrate be in the form of fibers. The presently useful fibers preferably are in a form selected from the group consisting of fiber rovings, chopped fibers, single fibers, woven fibers and the like. In order to provide improved point-to-point contacting in the fibrous substrate, which is highly desirable for improved conductivity and electrical effectiveness of the lead-acid battery, the substrate more preferably is in the form of a body of woven fibers, still more preferably, a body of woven fibers having a porosity in the range of about 60% to about 95%. Porosity is defined as the percent or fraction of void space within a body of woven fibers. The above-noted porosities are calculated based on the woven fibers including the desired doped tin oxide coating.

The substrate, because of availability, cost and performance considerations, preferably comprises acid resistant glass, more preferably in the form of fibers, as noted above.

The substrate is acid resistant. That is, the substrate exhibits some resistance to corrosion, erosion and/or other forms of deterioration at the conditions present, e.g., at or near the positive plate, or positive side of the bipolar plates, in a lead-acid battery. Although the doped tin oxide coating does provide a degree of protection for the substrate against these conditions, the substrate should itself have an inherent degree of acid resistance. If the substrate is acid resistant, the physical integrity and electrical effectiveness of the doped tin oxide coating and of the whole present battery element, is better maintained with time relative to a substrate having reduced acid resistance. If glass is used as the substrate, it is preferred that the glass have an increased acid resistance relative to E-glass. Preferably, the acid resistant glass substrate is at least as resistant as is C-glass to the conditions present in a lead-acid battery.

Typical compositions of E-glass and C-glass are as follows:

|  | Weight Percent | |
| --- | --- | --- |
|  | E-glass | C-glass |
| Silica | 54 | 65 |
| Alumina | 14 | 4 |
| Calcia | 18 | 14 |
| Magnesia | 5 | 3 |
| Soda + Potassium Oxide | 0.5 | 9 |
| Boria | 8 | 5 |

-continued

|  | Weight Percent | |
| --- | --- | --- |
|  | E-glass | C-glass |
| Titania + Iron Oxide | 0.5 | — |

Preferably the glass contains more than about 60% by weight of silica and less than about 35% by weight of alumina, and alkali and alkaline earth metal oxides The positive active electrode material is situated so that at least a portion of the electrically conductive doped tin oxide coated substrate contacts the electrode material. Any suitable positive active electrode material or combination of materials useful in lead-acid batteries may be employed in the present invention. One particularly useful positive active electrode material comprises electrochemically active lead oxide, e.g., lead dioxide, material. A paste of this materialis often used. If a paste is used in the present invention, it is applied so that there is appropriate contacting between the coated substrate and paste.

Any suitable matrix material may be used to embed at least a portion of the doped tin oxide coated substrate. The matrix material should be at least initially fluid impervious to be useful in the present battery elements and batteries. Preferably, the matrix material comprises a polymeric material, e.g., one or more synthetic polymers. The polymeric material may be either thermoplastic or a thermoset material. Among the thermoplastics useful in the present invention are the polyolefins, such as polyethylene, polypropylene, polymethylpentene and mixtures thereof; and poly vinyl polymers, such as polystyrene, polyvinylidene difluoride, combinations of polyphenylene oxide and polystyrene, and mixtures thereof. Among the thermoset polymers useful in the present invention are epoxies, phenol-formaldehyde polymers, polyesters, polyvinyl esters, polyurethanes, malamine-formaldehyde polymers, and urea-formaldehyde polymers.

In order to provide enhanced bonding between the doped tin oxide coated substrate and the matrix material, it is preferred that the matrix material have an increased polarity, as indicated by an increased dipole moment, relative to the polarity of polypropylene. Because of weight and strength considerations, if the matrix material is to be a thermoplastic polymer, it is preferred that the matrix be a polypropylene-based polymer which includes one or more groups effective to increase the polarity of the polymer relative to polypropylene. Additive or additional monomers, such as maleic anhydride, vinyl acetate, acrylic acid, and the like and mixtures thereof, may be included prior to propylene polymerization to give the product propylene-based polymer increased polarity. Hydroxyl groups may also be included in a limited amount, using conventional techniques, to increase the polarity of the final propylene-based polymer.

Thermoset polymers which have increased polarity relative to polypropylene, are more preferred for use in the present matrix material. Particularly preferred thermoset polymers include epoxies, phenol-formaldehyde polymers, polyesters, and polyvinyl esters.

A more complete discussion of the presently useful matrix materials is presented in commonly assigned U.S. Pat. No. 4,708,918, the entire disclosure of which is hereby expressly incorporated by reference herein.

Various techniques, such as casting, molding and the like, may be used to at least partially embed the doped tin oxide coated substrate into the matrix material. The choice of technique may depend, for example, on the type of matrix material used, the type and form of the substrateused and the specific application invikved. Certain of these techniques are presented in U.S. Pat. No. 4,547,443, the entire disclosure of which is hereby incorporated by reference herein. One particular embodiment involves pre-impregnating (or combining) that portion of the doped tin oxide coated substrate to be embedded in the matrix material with a relatively polar (increased polarity relative to polypropylene) thermoplastic polymer, such as polyvinylidene difluoride, prior to the coated substrate being embedded in the matrix material. This embodiment is particularly useful when the matrix material is itself a thermoplastic polymer, such as polypropylene, amnd has been found to provide inproved bonding between the doped tin oxide coated substrate and the matrix material.

The bonding between the matrix material and the doped tin oxide coated, acid-resistant substrate is important to provide effective battery operation. In order to provide for improved bonding of the doped tin oxide coating (on the substrate) with the matrix material, it is preferred to at least partially, more preferablysubstantially totally, coat the doped tin oxide coated substrate with a coupling agent which acts to improve the bonding of the doped tin oxide coating with the matrix. This is particularly useful when the substrate comprises acid resistant glass fibers. Any suitable coupling agent may be employed. Such agents preferably comprise molecules which have both a polar portion and a non-polar portion. Certain materials generally in use as sizings for glass fibers may be used here as a "size" for the doped tin oxide coated glass fibers. The amount of coupling agent used to coat the doped tin oxide coated glass fibers should be effective to provide the improved bonding noted above and, preferably, is substantially the same as is used to size bare glass fibers. Preferably, the coupling agent is selected from the group consisting of silanes, silane derivatives, titanates, titanate derivatives and mixtures thereof. U.S. Pat. No. 4,154,638 discloses one silane-based coupling agent adapted for use with tin oxide surfaces. The entire disclosure of this patent is hereby expressly incorporated by reference herein.

In the embodiment in which the present battery lelement is at least a portion of a bipolar plate in a lead-acid battery, it is preferred that the element further comprises a fluid-impervious conductive layer that is resistant to reduction adjacent to, and preferably in electrical communication with, the second surface of the matrix material. The conductive layer is preferably selected from metal, more preferably lead, and substantially non-conductive polymers, more preferably synthetic polymers, containing conductive material. The non-conductive polymers may be chosen from the polymers discussed previously as matrix materials. One particular embodiment involves using the same polymer in the matrix material and in the conductive layer. The electrically conductive material contained in the non-conductive layer preferably is selected from the group consisting of graphite, lead and mixtures thereof.

In the bipolar plate configuration, the present battery element further comprises a negative active electrode layer located to, and preferably in electric communication with the fluid impervious conductive layer. Any suitable negative active electrode material useful in lead-acid batteries may be employed in the present invention. One particularly useful negative active electrode material comprises lead, e.g., sponge lead. Lead paste is often used.

Certain of these and other aspects of the present invention are set forth in the following description and examples, particularly when considered in conjunction with the accompanying drawings in which like parts bear like reference numerals.

DETAILED DESCRIPTION OF PREFERRED EMBODIMENT

Figure 1:
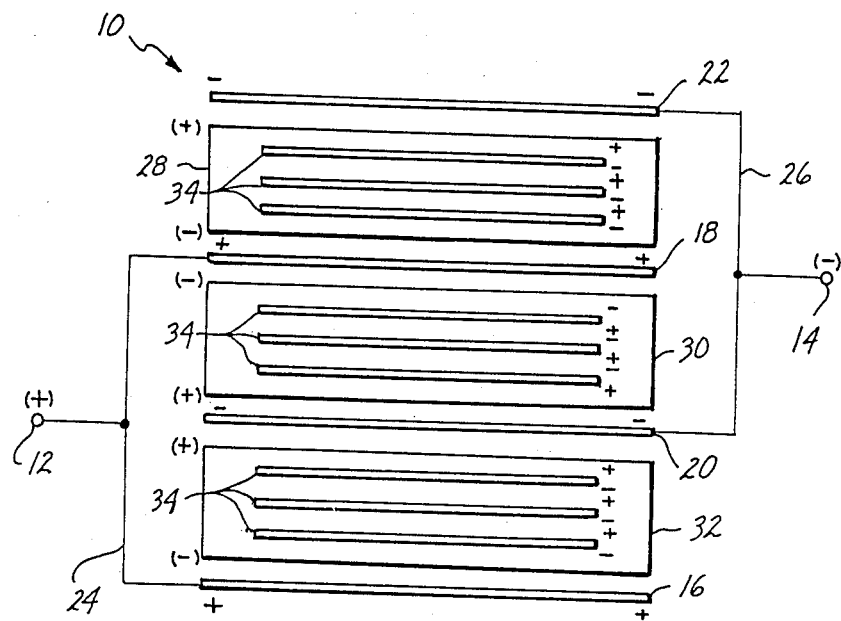
FIG. 1 is a schematic diagram of the series-parallel electrical connection of bipolar and monopolar plates.

Referring now to FIG. 1 a schematic representation of a bipolar battery 10 is shown, comprising a positive terminal 12 and a negative terminal 14. Battery 10 includes a monopolar grid or plate stack having two positive monopolar plates 16 and 18 and two negative monopolar plates 20 and 22.

Monopolar plates 16, 18, 20, 22 are stacked vertically with suitable electrolyte layers (not shown) provided. Positive monopolar plates 16 and 18 are connected in parallel by a bus bar, shown schematically at 24, to positive terminal 12 to provide an electric potential of about eight volts. The amount of current is determined by the size of positive monopolar plates 16 and 18. Negative monopolar plates 20 and 22 are connected by a bus bar, shown schematically at 26, to negative terminal 14 to also provide a voltage potential of about eight volts and a current varying depending upon the size of negative monopolar plates 20 and 22.

As is known in bipolar battery technology, bipolar plate groupings 28, 30, 32 are inserted between the monopolar plates 16, 18, 20, 22. Bipolar plate groupings 28, 30, 32 are positioned so that their uppermost and lowermost positive sides are adjacent to one of negative monopolar plates 20 and 22 and their uppermost and lowermost negative sides are adjacent to one of positive monopolar plates 16 and 18. Bipolar plate groupings 28, 30, 32 include a series of vertically stacked bipolar plates 34. Bipolar plates 34 are stacked vertically with suitable electrolyte layers (not shown) provided between bipolar plates 34 to provide a bipolar plate grouping having variable voltage depending upon the number of bipolar plates 34 present in a given grouping. It will be appreciated that the bipolar plate grouping is not connected to bus bars 24 and 26, but rather is secured within the battery stack by suitable non-conductive means (not shown).

Figure 2:
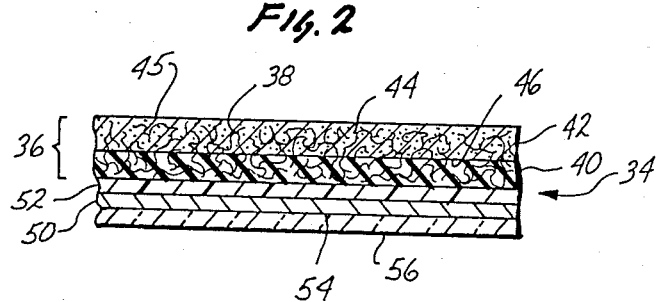
FIG. 2 is a cross-section of a bipolar plate for a lead-acid battery incorporating doped tin oxide coated acid resistant substrate.

Referring now to FIG. 2, a unitary, bipolar battery plate 34 is illustrated. Plate 34 comprises a body 36 of woven fiberglass with the glass being C-glass (with a composition substantially as indicated previously), the strands 38 of which contain a coating of electrically conductive fluoride ion doped tin oxide. Body 36 has a porosity of about 75%. The average diameter of the individual fibers or strands 38 in body 36 is about 5 microns. The average thickness of the doped tin oxide coating is about 1 micron and about 2 mole % of the coating is fluoride ion.

The lower portion of fiberglass body 36 is embedded in a layer 40 of synthetic, epoxy-type thermoset polymer forming a fluid-impervious, through-conductive substrate.

The lower portion of body 36 may be embedded in thermoset layer 40 using various techniques. It is preferred that the lower portionof body 36 be contacted with the material making up thermoset layer 40 before the thermoset polymer is fully cured. One of the advantages of using thermoset polymers, such as epoxies, for layer 40 is that the viscosity of the monomers or pre-polymers is sufficiently low to allow the doped tin oxide coated substrate, e.g., fiberglass body 36 to be contacted with the monomers or pre-polymers with no substantial undue breakage of the substrate, e.g., individual glass fiber strands within body 36. This low viscosity of the thermoset's monomers or pre-polymers provides for improved control over the manufacture of the doped tin oxide coated substrate-matrix composite. Prior to being partially embedded in layer 40, body 36 (including the doped tin oxide coating) is coated with a silane derived coupling agent as described in U.S. Pat. No. 4,154,638 to improve the bonding of body 36 with layer 40.

The upper portion of body 36 contains lead dioxide forming a positive active electrode layer 42. The paricles 44 of lead dioxide are in contact with strands 38 which form conduction paths from top surface 45 to bottom surface 46 of layer 42.

The thickness of the resin layer 40 is preferably in the range of about 1 to about 20 mils, more preferably about 4 to about 10 mils.

Positive active electrode layer 42 is prepared according to methods well established in the art. The lead dioxide particles 44 can be dispersed in water to form a paste and impregnated into the upper portion of body 36 and dried, or a precursor paste of lead sulfate and litharge (PbO) such as one containing 75% lead sulfate and 25% litharge in water can be worked into the pores of the upper portion of body 36 and dried and cured. The paste is converted to lead dioxide by applying a charging potential to the paste.

A layer 50, which is conductive and stable under reducing conditions, is adhered to plate 34 by a conductive adhesive such as a film 52 of graphite-filled epoxy adhesive. Layer 50 can be a thin film or foil of lead preferably having a thickness in the range of 0.5 to about 10 mils, more preferably about 1 to about 5 mils. The fabrication of the bipolar plate is completed by depositing a layer 54 of negative active material such as acid resistant glass fibers of body 36 have substantial stability at the agressive, acidic/oxidative conditions present on the positive side of bipolar plates 34. In addition, the present system provides for outstanding bonding between the coated substrate and the matrix material. Weakness in this bonding has been one primary cause of failure in prior art bipolar plates. Improved bonding between the doped tin oxide coated substrate and the matrix material at conditions present in the lead-acid battery is one of the primary advantages of the present invention.

EXAMPLES 1 TO 6

A series of six (6) materials were prepared for stability testing in 30 wt.% silfuric acid, which simulates the electrolyte in a typical lead-acid battery. These six (6) materials were as follows:

Composition 1—A glass mat composed of both C-glass and E-glass, typical compositions of which are as set forth previously. The mat or woven body was prepared from C-glass fiber bundles tied together (cross stitched) with E-glass strands. C-glass is more acid resistant than E-glass. The glass mat contained 33% by weight of E-glass and was coated, using conventional techniques with stannic oxide.

Composition 2—E-glass fibers coated with stannic oxide were composited with polypropylene by compression molding polypropylene film sheets in a laminated mode to avoid undue breaking of the relatively fragile fibers.

Composition 3—A stannic oxide coated glass mat as in Composition 1 was impregnated with polyvinylidene difluoride (PVDF) so that the final composite contained about 30% by weight of PVDF.

Composition 4—Fibers of C-glass as used in Composition 1.

Composition 5—Fibers of E-glass as used in Composition 1 coated with stannic oxide.

Composition 6—Fibers of C-glass as used in Composition 1 coated with stannic oxide.

Distilled, deionized water used to prepare the 30 wt.% sulfuric acid electrolyte. Relative amounts of the electrolyte and composition were scaled to provide sufficient analyte for analytical purposes. The tests were conducted for periods of time as shown in the table below at ambient temperature conditions. Periodic samples of electrolyte were taken and analyzed for calcium and tin.

The results of the stability testing were as follows:

| COMPOSITION | HOURS | Ca/Sn* | HOURS | Ca/Sn* | HOURS | Ca/Sn* |
|---|---|---|---|---|---|---|
| 1 | 48 | 6.1/2.8 | 143 | 20.3/6.7 | 268 | 258/2.7 |
| 2 | 48 | 2.7/1.6 | 143 | 9.4/2.6 | 268 | 14.7/0.5 |
| 3 | 48 | 4.7/1.9 | 143 | 13.9/1.3 | 268 | 20/0.4 |
| 4 | 48 | 1.6/— | 143 | 2/— | 268 | 2.5/— |
| 5 | 100 | 61/1.6 | — | — | — | — |
| 6 | 100 | 0.5/1.6 | — | — | — | — |

*The concentration of soluble calcium and tin in the electrolyte is expressed as weight parts per million (ppm) in the electrolyte sample lead paste onto layer 50 supported by a sheet 56 of glass scrim.

Battery 10 is placed in service and performs well in both the charge and discharge modes. The doped tin oxide coating on body 36 provides adaquate conductivity. Importantly, this performance continues after a period of time in charge/discharge cyclic operation. This performance stability is vital in many lead-acid battery applications. Thus, the doped tin oxide coated, The calcium levels are initially relatively high and/or increase with time whenever E-glass is present (Compositions 1, 2, 3 and 5). In compositions containing only C-glass (Compositions 2 and 6), the calcium levels are initially relatively low and are substantially maintained at this low level with time.

These results clearly show that C-glass is superior to E-glass as a substrate material in the present invention. Deterioration of the substrate material can result in reduced conductivity or even complete battery failure.

Although the doped tin oxide coating does protect the substrate somewhat from acid attack, the combination of doped tin oxide coating on a substrate having inherent acid resistance has been found not only to more effectively thwart electrolyte attack, but also to provide improved overall lead-acid battery performance. Preferably, additional meamns are employed to protect the substrate from attack in the agressive environment of the lead-acid battery. The preferred use of certain forms of acid resistant substrates, coupling agents, doped tin oxide coating techniques, and/or polymeric matrix materials provide the present battery elements and batteries with improved electrochemical, physical and/or mechanical performance and/or performance stability.

While the invention has been described with respect to various specific embodiments and examples, it is to be understood that the invention is not limited thereto and that it can be variously practiced within the scope of the following claims.

The embodiments of the invention in which an exclusive property or privilege is claimed are defined as follows:

1. A process for at least partially coating fibers with an electrically conductive, fluorine doped, tin-containing coating comprising (1) contacting a vaporous composition comprising at least one component of tin and at least one fluorine-containing component with said fibers; and (2) contacting said contacted fibers with an oxygen-containing vaporous medium at conditions effective to form said electrically conductive, fluorine doped, tin-containing coating on said fibers, provides that said fibers are maintained in substantially constant three dimensional motion during steps (1) and (2).

2. The process of claim 1 wherein said steps (1) and (2) occur sequentially.

3. The process of claim 1 wherein said steps (1) and (2) occur substantially simultaneously in at least one fluidized bed reaction zone.

4. The process of claim 1 wherein said fibers are glass fibers.

5. The process of claim 4 wherein said conditions are effective to form an electrically conductive, fluorine doped tin oxide coating on said glass fibers.

* * * * *

UNITED STATES PATENT AND TRADEMARK OFFICE
CERTIFICATE OF CORRECTION

PATENT NO. : 4,787,125
DATED : November 29, 1988
INVENTOR(S) : Naum Pinsky et al It is certified that error appears in the above-identified patent and that said Letters Patent is hereby corrected as shown below:

Cover Page

[62] delete "4,708,918" and insert in place thereof -- 4,713,306 --.

Column 1, line 8; delete "4,708,918" and insert in place thereof -- 4,713,306 --.

Signed and Sealed this

Thirtieth Day of May, 1989

Attest:

DONALD J. QUIGG

Attesting Officer

Commissioner of Patents and Trademarks